United States Patent
Olgren et al.

(10) Patent No.: US 8,123,251 B2
(45) Date of Patent: Feb. 28, 2012

(54) COLLAPSIBLE STEERING COLUMN ASSEMBLY

(75) Inventors: Leland N. Olgren, Frankenmuth, MI (US); Michael S. Gregus, Saginaw, MI (US); Donald A. Niedzielski, Bay City, MI (US); Germaine Niedzielski, legal representative, Bay City, MI (US); Roger A. Bourbina, Saginaw, MI (US); Jeff A. Gregg, Owosso, MI (US)

(73) Assignee: Steering Solutions IP Holding Company, Saginaw, MI (US)

( * ) Notice: Subject to any disclaimer, the term of this patent is extended or adjusted under 35 U.S.C. 154(b) by 0 days.

(21) Appl. No.: 12/640,054

(22) Filed: Dec. 17, 2009
(Under 37 CFR 1.47)

(65) Prior Publication Data

US 2010/0212451 A1    Aug. 26, 2010

Related U.S. Application Data

(63) Continuation of application No. 11/895,536, filed on Aug. 24, 2007, now Pat. No. 7,665,767.

(60) Provisional application No. 60/905,715, filed on Mar. 8, 2007.

(51) Int. Cl.
*B62D 1/19* (2006.01)
(52) U.S. Cl. ............................ 280/777; 280/775; 74/493
(58) Field of Classification Search .................. 280/775, 280/777; 74/493
See application file for complete search history.

(56) References Cited

U.S. PATENT DOCUMENTS

| | | | |
|---|---|---|---|
| 6,692,025 B2 | 2/2004 | Yoshioka et al. | |
| 6,722,168 B2 | 4/2004 | Kitami et al. | |
| 6,863,306 B2 | 3/2005 | Bechtel et al. | |
| 6,923,473 B2 | 8/2005 | Ryne et al. | |
| 6,990,874 B2 | 1/2006 | Murakami et al. | |
| 2002/0033593 A1 | 3/2002 | Hancock et al. | |
| 2003/0000330 A1* | 1/2003 | Murakami et al. | 74/492 |
| 2006/0186658 A1 | 8/2006 | Yasuhara et al. | |

FOREIGN PATENT DOCUMENTS

| | | |
|---|---|---|
| EP | 1245472 A2 | 10/2002 |
| JP | 2006-82224 A * | 7/2006 |

OTHER PUBLICATIONS

European Search Report and Office Action dated Oct. 21, 2009 for European Application No. 08151778.1.

* cited by examiner

*Primary Examiner* — Ruth Ilan
(74) *Attorney, Agent, or Firm* — Cantor Colburn LLP

(57) ABSTRACT

An adjustable steering column assembly for a vehicle preferably has a bracket for rigid attachment to the vehicle with a first slot defining a longitudinal adjustment path of the assembly. A steering shaft is journaled to a jacket of the assembly for rotation about an axis. A shuttle attaches rigidly to the jacket and adjustably to the bracket for telescoping and tilt adjustment of the assembly. The shuttle has a second slot that defines a collapse path with said second slot preferably having a first portion restraining said steering shaft in a normal state and a second portion that allows said steering shaft to move through said collapse path when in a collapsed state. A pin extends through said first and second slots for coupling said shuttle to said bracket.

11 Claims, 6 Drawing Sheets

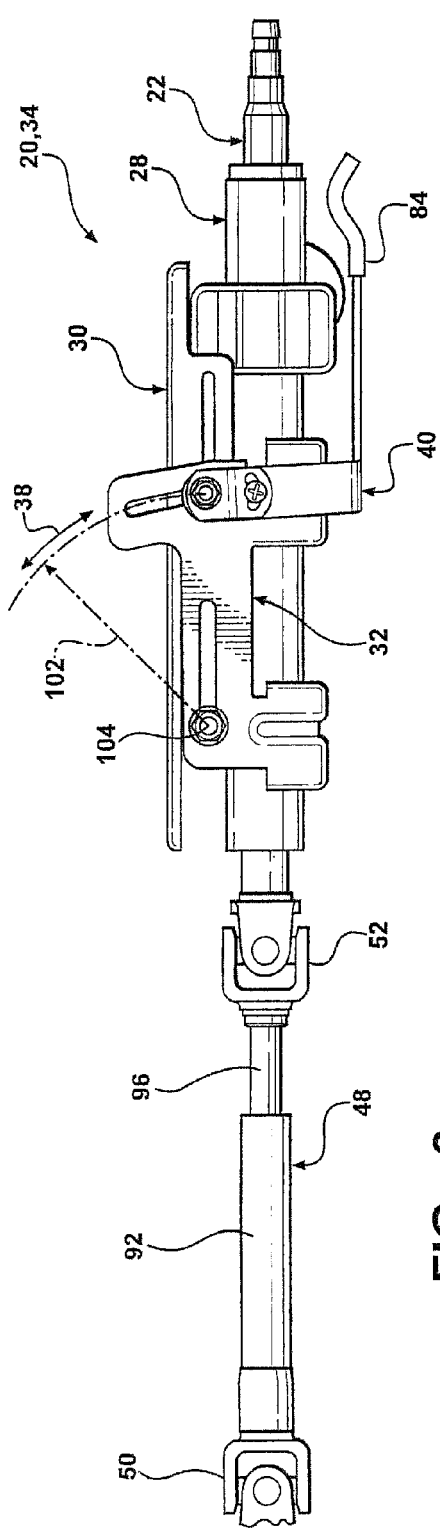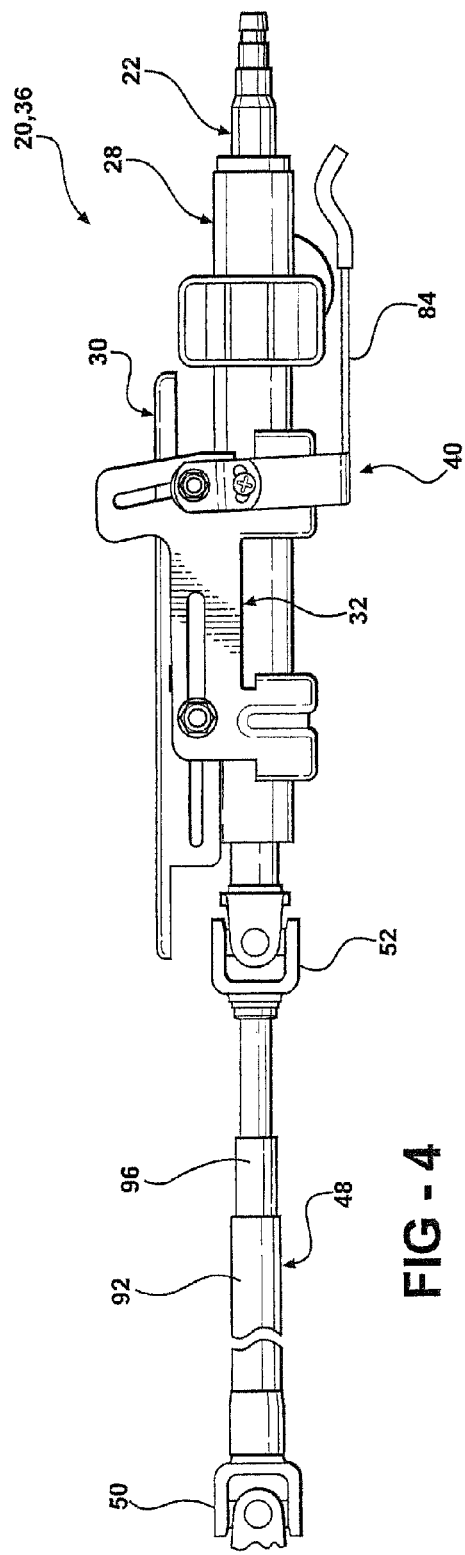
FIG - 3
FIG - 4

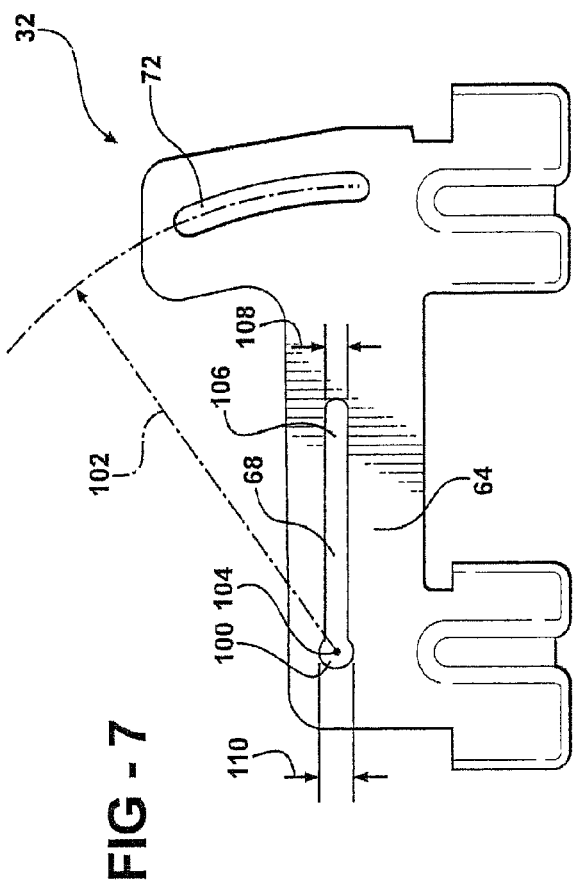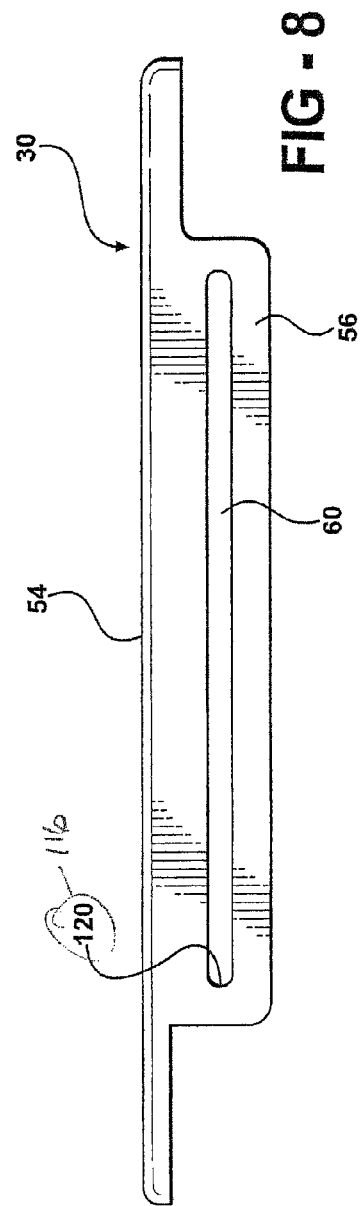

COLLAPSIBLE STEERING COLUMN ASSEMBLY

RELATED APPLICATIONS

This application is a continuation of U.S. Ser. No. 11/895,536 filed Aug. 24, 2007, which also claims priority to U.S. Provisional Patent Application Ser. No. 60/905,715 filed Mar. 8, 2007, the contents each of which are incorporated herein by reference thereto.

FIELD OF THE INVENTION

This application relates generally to an adjustable steering column assembly for a vehicle, and more particularly to an adjustable steering column that longitudinally collapses during a vehicle crash for the absorption of kinetic energy.

BACKGROUND ART

Automotive steering columns are typically equipped with kinetic energy absorption devices to reduce injury of the vehicle operator in event of a collision during which the operator impacts the steering wheel, causing the column to collapse.

Such energy absorbing steering columns generally include a jacket that translates linearly through a collapse stroke during a collision. A force generated by the driver from an impact with the steering wheel initiates the collapse stroke. The steering wheel jacket moves against a resisting force that may be produced by an energy absorber designed to convert a portion of the driver's kinetic energy into work. The resisting force may be generated utilizing systems currently known in the art, including the plastic deformation of a metal element that is a part of an energy absorbing device.

Typically, the column assembly is secured to the vehicle structural member that may be part of its instrument panel or a cross-car beam. As is well-known in the art, the column jacket is provided with a mounting bracket having capsules fitted thereto through which bolts extend, the capsules being dislodged from the column mounting bracket as the column strokes during collapse, thereby permitting forward translation of the column relative to the vehicle structural member while the capsules remain secured to the vehicle structural member, the forward translation of the column being against the resisting force of the energy absorbing device.

The mounting bracket and its capsules also provide the means for vertically supporting the end of the column nearest the hand wheel, and upon release of the capsules from the mounting bracket during column collapse, the column assembly and the steering wheel, now no longer vertically supported through the capsules' being secured to the vehicle's structural member, may drop into the driver's lap and impede his extrication from the vehicle after the collision. It has been found desirable, and becoming increasingly required, that the steering column remain upwardly supported away from the driver after collapse of the column during crash. Thus, there is a need for a collapsible steering column assembly that provides such a feature, preferably at low cost and without great complexity. It is further desirable that such a column assembly also be provided with driver-adjustable rake and/or telescope positioning features often found in prior vehicles.

SUMMARY OF THE INVENTION

In an embodiment, an adjustable steering column assembly for a vehicle comprises a bracket for rigid attachment to the vehicle and having slots defining a longitudinal path. A telescoping steering shaft is rotatable about an axis. A jacket is journaled to said shaft and a shuttle is attached rigidly to said jacket and has mounting slots therein. A pin extends though said bracket slots and said mounting slots to connect said shuttle to said bracket, wherein said bracket slots or said mounting slots have a first portion restraining said pin, said shuttle and said jacket in a normal state and a second portion allowing said pin, said shuttle and said jacket to move through a collapse path when in a collapse state.

In another embodiment, an adjustable steering column assembly of a vehicle comprises a bracket for rigid attachment to the vehicle and having a slot defining a longitudinal path. A telescoping steering shaft is rotatable about an axis. A telescoping jacket is journaled to said shaft and a shuttle is attached rigidly to said telescoping jacket and has a rake adjustment path defined by substantially vertical slots therein. A rake rod extends though said bracket slot and said substantially vertical slots to moveably connect said shuttle to said bracket for rake adjusting said telescoping steering shaft and said telescoping jacket, wherein said bracket slot has a first portion restraining said pin, shuttle and said telescoping jacket in a normal state and a second portion allowing said pin, said shuttle and said telescoping jacket to move through a collapse path when in a collapse state.

Objects, features and advantages of the present invention include an adjustable steering column assembly that remains upwardly supported and away from the driver after a collision. Other advantages include an assembly that is both longitudinally and rake adjustable, and a robust and relatively simple design that is economical to manufacture and requires little or not maintenance.

BRIEF DESCRIPTION OF THE DRAWINGS

These and other objects, features and advantages of this invention will be apparent from the following detailed description, appended claims, and accompanying drawings in which:

FIG. 3 is a side view of the adjustable steering column assembly in a retracted position;

FIG. 4 is a side view of the adjustable steering column assembly in an extended position;

FIG. 7 is a side view of a shuttle of the adjustable steering column assembly;

FIG. 8 is a side view of a bracket of the adjustable steering column assembly;

and

Figure 9:
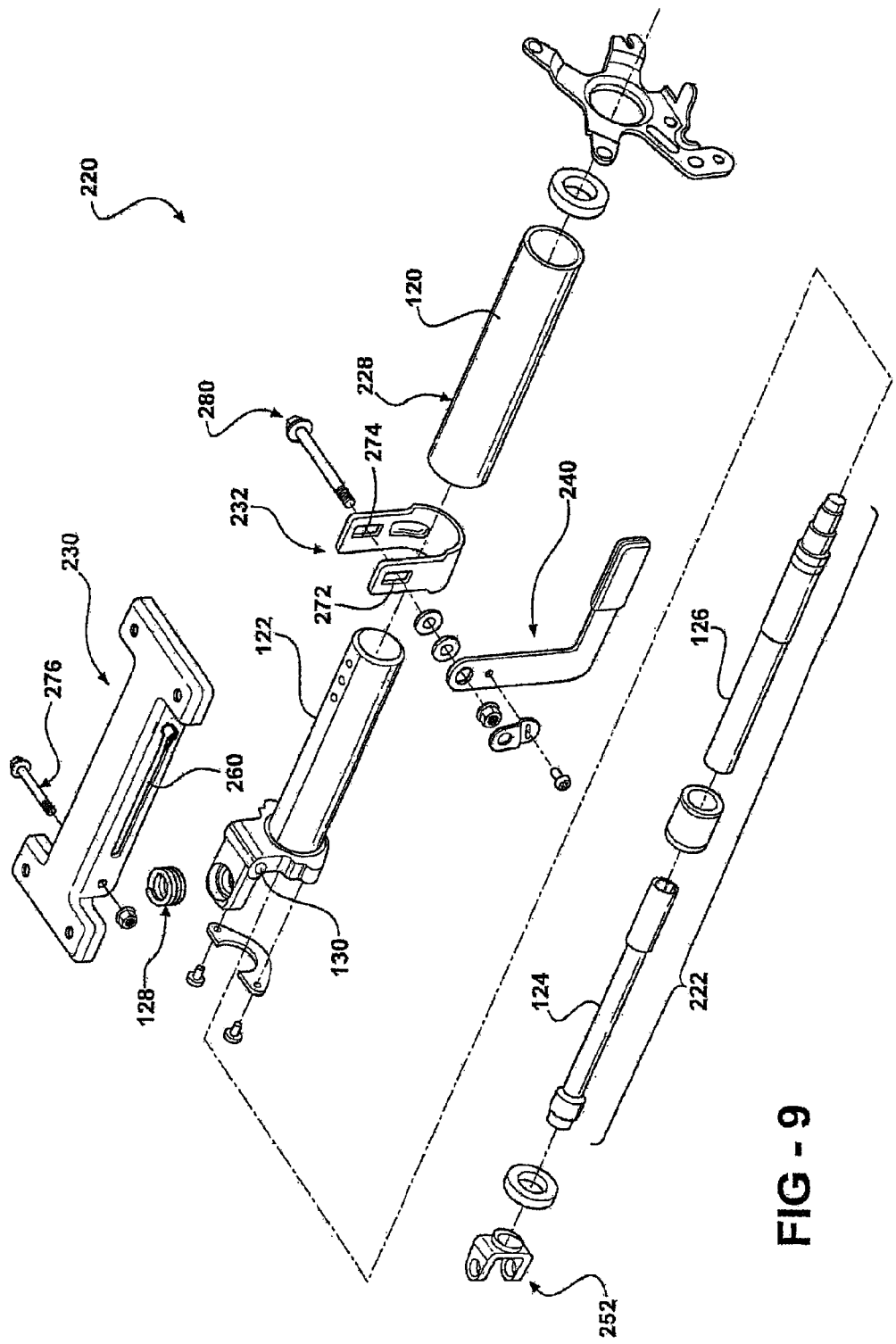

FIG. 9 is an exploded perspective view of a second embodiment of an adjustable steering column assembly.

DETAILED DESCRIPTION OF THE INVENTION

Figure 1:
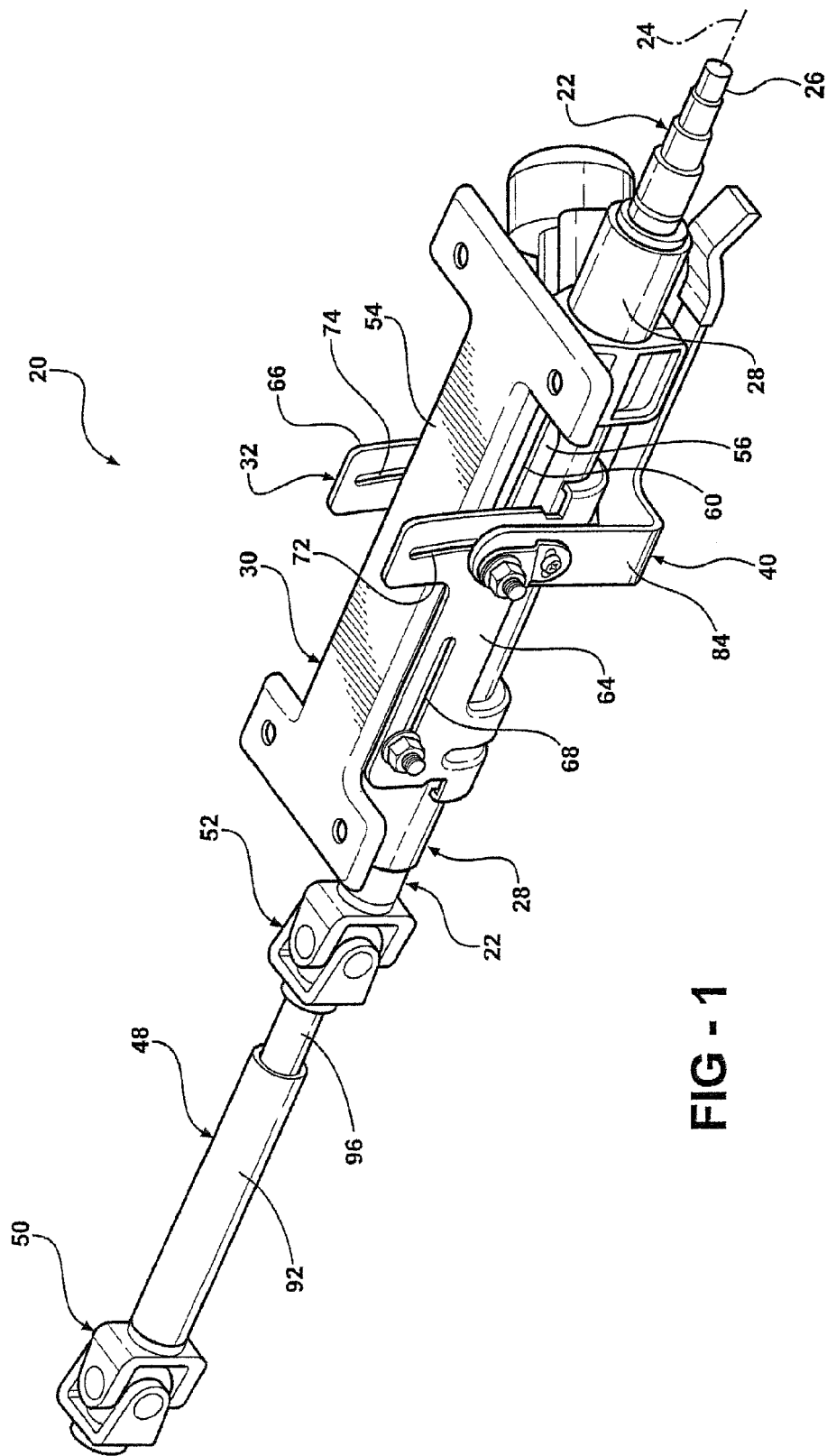
FIG. 1 is a perspective view of an adjustable steering column assembly embodying the present invention.
Figure 2:
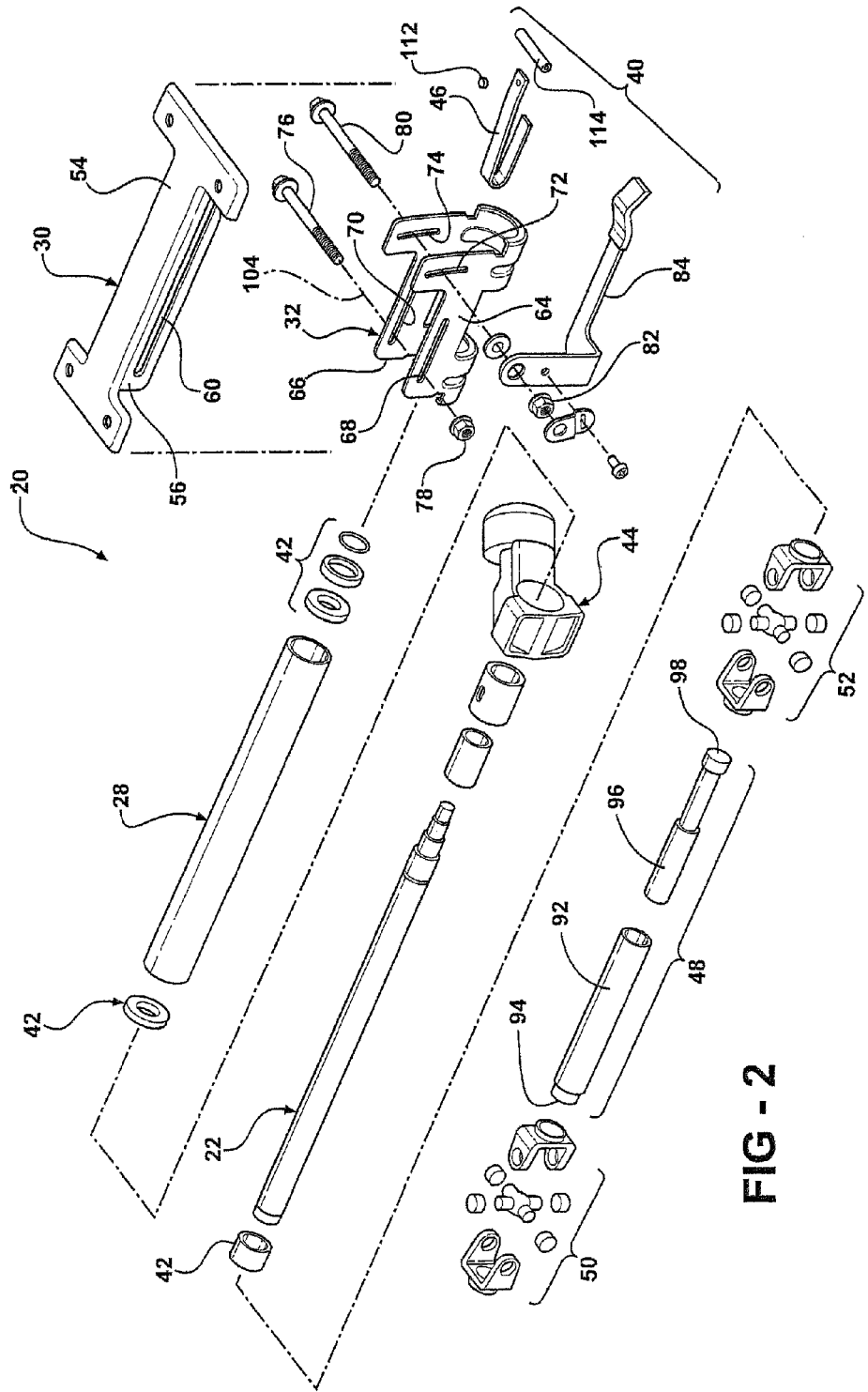
FIG. 2 is an exploded perspective view of the adjustable steering column assembly.
Figure 5:
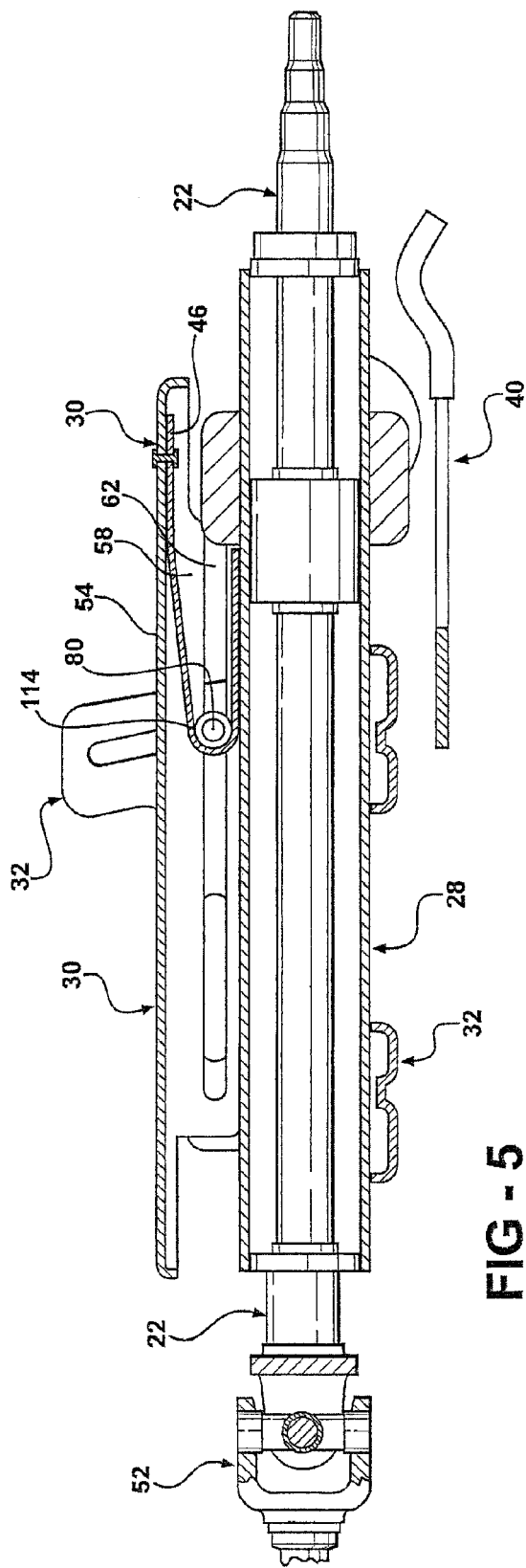
FIG. 5 is a cross section of the adjustable steering column assembly of FIG. 1.

Referring now to FIGS. 1 and 2 of the drawings, an adjustable steering column assembly 20 for a vehicle has a steering shaft 22 that projects rearward with respect to the vehicle and along a rotation axis 24 to a distal end 26 that attaches to a steering wheel (not shown). The steering shaft 22 is preferably journaled to and rotates within a tubular housing or jacket 28 engaged rigidly to or generally having a compression bracket or shuttle 32. The shuttle 32 is supported by a bracket 30 of the assembly 20 that engages rigidly to a chassis of the vehicle via a plurality of fasteners (not shown) that project preferably upward from the bracket 30 to engage the chassis.

The jacket 28 and co-extending shaft 22 are preferably constructed and arranged to extend and retract longitudinally as a single unit and with respect to the bracket 30 between a retracted position 34 (see FIG. 3) and an extended position 36 (see FIG. 4). When extending, the jacket 28 and shaft 22 move in a linear rearward direction with respect to the vehicle, and when retracting, the jacket 28 and shaft 22 move in a forward direction and generally into the bracket 30.

This forward and rearward movement, however, is not necessarily parallel to rotation axis 24 of steering shaft 22 because the jacket 28 and shaft 22 are preferably constructed and arranged to tilt as a single unit between a rake or tilt down state (not shown) and a rake or tilt up state (as shown in FIGS. 3 and 4). This tilt adjustment moves the distal end 26 of the steering shaft 22 in an arcuate and substantially vertical direction (see arrow 38 in FIG. 3). To accommodate drivers of small stature, the jacket 28 is generally extended near the extended position 36 and tilt down state. To comfortably accommodate drivers of larger stature, the jacket 28 is generally retracted to near the retracted position 34 and the tilt up state.

In addition to the steering shaft 22, the jacket 28, the bracket 30 and the shuttle 32, the steering column 20 also has a locking device 40 that is supported by and interfaces between the shuttle 32 and bracket 30 for column adjustment. Various bushings 42 of the assembly 20 rotationally support of the steering shaft 28 to the jacket 28 and a steering lock mechanism 44 is integrated between the shaft 22 and an ignition (not shown) to prevent shaft rotation when the vehicle ignition is off A kinetic energy absorbing device or strap 46 of the assembly 20 absorbs kinetic energy produced when a driver strikes the steering wheel during vehicle collisions, and an adjustable intermediate shaft 48 of assembly 20 extends between forward and rearward universal joints 50, 52. The forward joint 50 connects to a front steering system or steering gear assembly of the vehicle (not shown) and the rearward joint 52 connects to the steering shaft 22.

Referring to FIGS. 1-2, 5 and 8, the bracket 30 has a substantially horizontal base plate 54 preferably secured rigidly to the vehicle chassis beneath a dash structure. Two vertical panels 56, 58 of the bracket 30 project downward from the base plate 54 to adjustably connect with the shuttle 32. The panels 56, 58 are each elongated horizontally, are substantially parallel to one another, and carry respective slots 60, 62 that also extend horizontally. Preferably and as illustrated, the mounting bracket 30 is a stamping, however, alternative versions of this bracket may be a casting.

Referring to FIGS. 1-2, 5 and 7, the shuttle 32 is generally U-shaped and rigidly connects to the jacket 28. Two substantially vertical walls 64, 66 of the shuttle 32 project substantially upward and generally above the jacket 28 for adjustable connection to the respective panels 56, 58 of the bracket 30. Substantially horizontal slots 68, 70 and substantially vertical and arcuate slots 72, 74 are in respective walls 64, 66, so that slots 68, 70 generally co-extend with respective slots 60, 62 in the bracket 30 and slots 72, 74 cross over respective slots 60, 62 in the bracket 30. Preferably, the arcuate slots 72, 74 are parallel to one another and spaced rearward from the respective slots 68, 70.

When the shuttle 32 is assembled to the bracket 30, a guide pin 76 extends through slots 68, 70 of the shuttle 32 and through slots 60, 62 of the bracket 30. Preferably, the pin 76 is a threaded bolt having an enlarged head at one end and a threaded nut 78 at an opposite end. Similarly, a rake rod 80 projects through arcuate slots 72, 74 of the shuttle 32 and slots 60, 62 of the bracket 30. The rod 80 is preferably a threaded bolt having an enlarged head at one end and a threaded nut 82 at an opposite end. The rod 80 is generally part of the locking device 40 that further has a handle 84 that interfaces with the bolt 80 axially between the nut 82 and the wall 64 of the shuttle 32. When the handle 84 is actuated or rotated about rod 80, the walls 64, 66 release and clamp against the bracket 30 for respective adjustment of the column assembly 20 and locking established adjustment in place.

Figure 6:
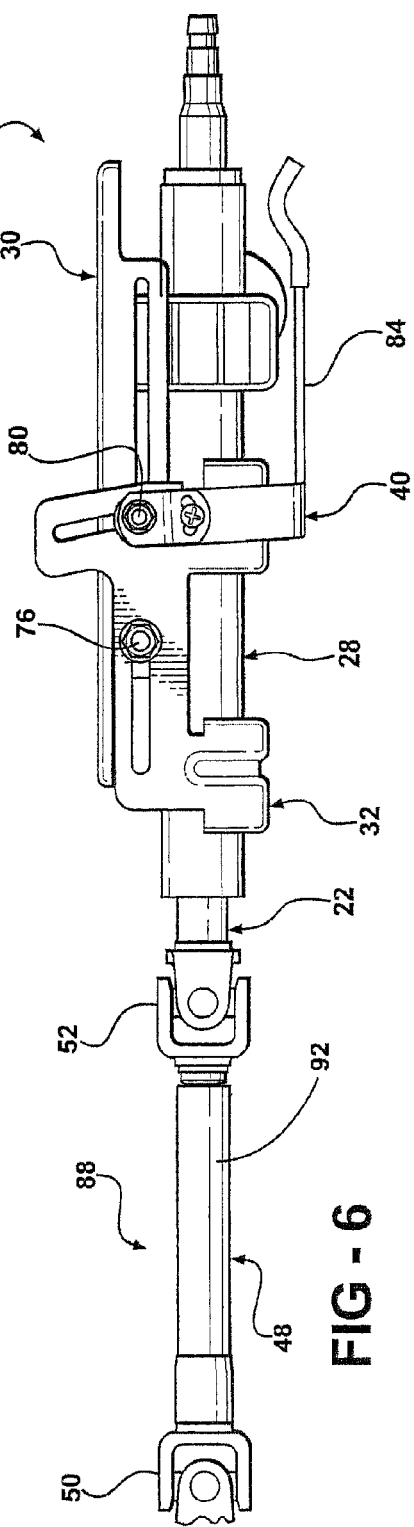
FIG. 6 is a side view of the adjustable steering column assembly is a collapsed state.

Referring to FIGS. 1-4 and 6, the intermediate shaft 48 adjusts axially (i.e. telescopically) for longitudinal adjustment of the column assembly from the retracted position 34 to the extended position 36 when in a normal state or configuration, and also adjusts longitudinally to a collapsed position 88 when the assembly is in a collapsed state 90 (see FIG. 6). To achieve axial adjustment, the intermediate shaft 48 has an outer sleeve 92 that attaches to the forward U-joint 50 at a forward end 94, and an inner sleeve 96 that attaches to the rearward U-joint 52 at a rearward end 98. The inner sleeve 96 is slidably disposed inside the outer sleeve 92, and are rotatably fixed to one another preferably through splines in a manner well-understood by those of ordinary skill in the art.

During normal operation of the assembly (i.e. normal state 86), the guide pin 76 is fixed releasably in forward end portions 100 of both horizontal slots 68, 70 of the compression shuttle 32 (see FIGS. 1 and 7). When so fixed, the guide pin 76 is positioned furthest away from the rake rod 80 and generally by a distance that is equal to a radius of curvature 102 of the arcuate slots 72, 74 (i.e. from a centerline 104 of pin 76 to a mean radius of curvature of the arcuate slots). The remaining portion or rearward end portions 106 of straight slots 68, 70 project rearward from respective portions 100 by a distance that is generally equal to a collapse stroke of the assembly 20 during a collision. During this collapse stroke kinetic energy is absorbed as the pin 76 travels through portion 106 of slots 68, 70. To absorb kinetic energy, the walls 64, 66 of shuttle 32 are plastically deformed. Such deformation occurs because a width 108 of portion 106 is less than a diameter of the pin 76. In contrast, a width 110 of portion 100 of slots 68, 70 is lightly greater than the pin diameter for pivoting of the shuttle 32 and jacket 28 about centerline 104 during rake adjustment of the steering column.

During telescopic adjustment of the steering column assembly 20, the intermediate shaft 48 extends and/or retracts telescopically and the shuttle 32 moves with respect to bracket 30. During this movement, the pin 76 and rod 80 maintain a constant distance (i.e. the radius of curvature 102) from each other, and move together along bracket slots 60, 62. During raking adjustment of the column assembly 20, in which mounting bracket 30 and compression shuttle 32 are moved angularly relative to each other, rake rod 80 moves along arcuate slots 72, 74 with compression shuttle 32 pivoting relative to mounting bracket 30 and about the centerline 104 of guide pin 76.

Referring to FIGS. 2 and 7-8, the energy absorbing system or U-shaped strap 46 of assembly 20 will further absorb kinetic energy during collapse by resistively permitting motion between the vehicle structural member and the steering shaft 22. The strap 46 may be an elongate metal element having a first end secured to mounting bracket 30 with rivet 112, and a free second end that lies along the outer surface of jacket 28. Between its first and second ends, strap 46 is disposed about rake rod 80. During initial column collapse, any inward travel available to normal telescopic movement of the column is taken up as the above-mentioned frictional engagement between compression shuttle 32 and mounting bracket 30 is overcome. Beyond the point where normal inward telescopic column travel is reached (i.e. guide pin 76 rest upon a rearward stop 120 carried by panels 56, 58 of bracket 30 generally defining ends of slots 60, 62), at which point a bushing 114 about rake rod 80 becomes seated in the U-shaped bend of strap 46 and/or guide pin 76 reaches the rearward end of slots 68, 70 plastic deformation of the strap 46 occurs as column collapse continues. During this portion of column collapse, as strap 46 becomes unwrapped from about rake rod bushing 114, guide pin 76 is dislodged from its releasably fixed position within substantially horizontal slots 68, 70 and slides along slots 68, 70 toward rake rod 80 (as shown through comparison of FIGS. 3 and 6). Collapse of the column assembly 20 as described above also causes continued telescopic collapse of intermediate shaft 48.

During and subsequent to assembly 20 collapse as a result of a collision, the column assembly and hand wheel remains upwardly supported away from the driver, thereby facilitating his extrication from the vehicle after the collision. At all times, mounting bracket 30 remains fixed to the vehicle structural member (not shown), and compression shuttle 32 remains connected to mounting bracket 30, as does jacket 28, shaft 22 and the hand wheel. Maintained frictional engagement between compression shuttle 32 and mounting bracket 30 subsequent to collapse would maintain the column's set rake position, thereby upwardly supporting the column away from the driver's lap.

Further, during collapse, as guide pin 76 moves from its releasably fixed position along substantially horizontal slots 68, 70 toward rake rod 80, it is moved to distances smaller than the radii of curvature 102 of slots 72, 74, thereby inhibiting pivoting movement of the compression shuttle 32 about the centerline 104 of guide pin 76 through movement of the compression shuttle relative to rake rod 80; the curved sides of arcuate slots 72, 74 coming into interfering engagement with the rake rod 80. Thus downward movement of the column from its set rake position through the possible disengagement of locking device 40 during the collision would also be inhibited by the changed distance between guide pin 76 and rake rod 80 resulting from column collapse, thereby upwardly supporting the column away from the driver's lap.

Referring to FIG. 9, a second embodiment of a steering column assembly 220 is illustrated wherein like elements to the first embodiment are identified with like element numbers except with the addition of two hundred. Unlike assembly 20, assembly 220 has a telescoping jacket 228 that generally/functionally replaces the telescoping intermediate shaft 48 of the first embodiment. Therefore, the jacket 228 has an outer sleeve 120 and an inner sleeve 122 that move axially with respect to one another. Similarly, a telescoping steering shaft 222, disposed in the jacket 228 has an elongated inner portion 124 and an elongated outer portion 126 that move axially with respect to one another and in unison with the telescoping movement of the jacket 228. A coiled or compression spring 128 is compressed between a support structure 130 of the inner sleeve 122 and the underside of the bracket 230 to assist in tilt adjustment.

In operation, the inner sleeve 122 of the jacket 228 remains longitudinally stationary with respect to the bracket 230 while allowing the jacket 228 to adjustably tilt about the pivot pin 276 that extends through the bracket 230 and the support structure 128 of the inner sleeve 122. The shuttle 232 is engaged rigidly to the outer sleeve 120 of the jacket 228 and a rake rod 280 extends through substantially vertical slots 272, 274 in the shuttle 232 and substantially horizontal slots 260 in the bracket 230. The assembly 220 does not have the shuttle slots 68, 70 of the first embodiment. Instead, the slots 260 are contoured for plastic deformation of the bracket 230 by the rod 280 during a collision.

While the forms of the invention herein disclosed constitute presently preferred embodiments, many others are possible. It is not intended herein to mention all the possible equivalent forms or ramification of the invention. It is understood that terms used herein are merely descriptive, rather than limiting, and that various changes may be made without departing from the spirit or scope of the invention.

The invention claimed is:
1. An adjustable steering column assembly of a vehicle comprising:
   a bracket for rigid attachment to the vehicle with said bracket having slots defining a longitudinal path extending in a longitudinal direction;
   a telescoping steering shaft for rotation about an axis;
   a jacket journaled to said shaft;
   a shuttle attached rigidly to said jacket and having mounting slots therein;
   a pin extending though said bracket slots and said mounting slots to connect said shuttle to said bracket, wherein said bracket slots or said mounting slots have a first portion restraining said pin, said shuttle and said jacket in a normal state and a second portion allowing said pin, said shuttle and said jacket to move through a collapse path when in a collapse state; and
   a second pin positioned in the bracket and spaced from said pin by a variable distance in the longitudinal direction when in the collapse state.

2. The adjustable steering column assembly of claim 1, wherein said bracket slots have the first portion and second portion, and said mounting slots are substantially vertical slots configured to moveably connect said shuttle to said bracket for rake adjusting said telescoping steering shaft and said jacket.

3. The adjustable steering column assembly of claim 2, said jacket further comprising:
   a first inner sleeve; and
   a second outer sleeve moveable axially relative to said first inner sleeve and having said shuttle attached rigidly thereto.

4. The adjustable steering column assembly of claim 3, said jacket further comprising:
   a support structure fixedly mounted to said first inner sleeve; and
   the second pin is a pivot pin extending through said support structure and said bracket and configured to pivotally connect said jacket to said bracket.

5. The adjustable steering column assembly of claim 4, said jacket further comprising:
   a spring member disposed between said support structure and said bracket and configured to assist said rake adjustment.

6. The adjustable steering column assembly of claim 1, wherein said movement of said pin through said second portion of said bracket slots plastically deforms said bracket.

7. An adjustable steering column assembly of a vehicle comprising:
   a bracket for rigid attachment to the vehicle with said bracket having a slot defining a longitudinal path;
   a telescoping steering shaft for rotation about an axis;
   a telescoping jacket journaled to said shaft;

a shuttle attached rigidly to said telescoping jacket and having a rake adjustment path defined by substantially vertical slots therein; and a rake rod extending though said bracket slot and said substantially vertical slots to moveably connect said shuttle to said bracket for rake adjusting said telescoping steering shaft and said telescoping jacket, wherein said bracket slot has a first portion restraining said rake rod, shuttle and said telescoping jacket in a normal state and a second portion allowing said rake rod, said shuttle and said telescoping jacket to move through a collapse path when in a collapse state.

8. The adjustable steering column assembly of claim 7, said telescoping jacket further comprising:

a first inner sleeve; and a second outer sleeve moveable axially relative to said first inner sleeve and having said shuttle attached rigidly thereto.

9. The adjustable steering column assembly of claim 8, said telescoping jacket further comprising:

a support structure fixedly mounted to said first inner sleeve; and a pivot pin extending through said support structure and said bracket and configured to pivotally connect said telescoping jacket to said bracket.

10. The adjustable steering column assembly of claim 9, said telescoping jacket further comprising:

a spring member disposed between said support structure and said bracket and configured to assist said rake adjustment.

11. The adjustable steering column assembly of claim 7, wherein said movement of said rake rod through said second portion of said bracket slot plastically deforms said bracket.

* * * * *